G. N. BRIGHAM.
Churn.

No. 56,520. Patented July 24, 1866.

Inventor:
Geo. N. Brigham
By his Atty.

UNITED STATES PATENT OFFICE.

GEORGE N. BRIGHAM, OF MONTPELIER, VERMONT.

IMPROVEMENT IN CHURNS.

Specification forming part of Letters Patent No. 56,520, dated July 24, 1866.

*To all whom it may concern:*

Be it known that I, GEORGE N. BRIGHAM, of Montpelier, in the county of Washington, in the State of Vermont, have invented certain new and useful Improvements in Churns for making and working butter; and I do hereby declare that the following is a full, clear, and exact description of the same, reference being had to the accompanying drawings, making a part of this specification, in which—

Figure 1:
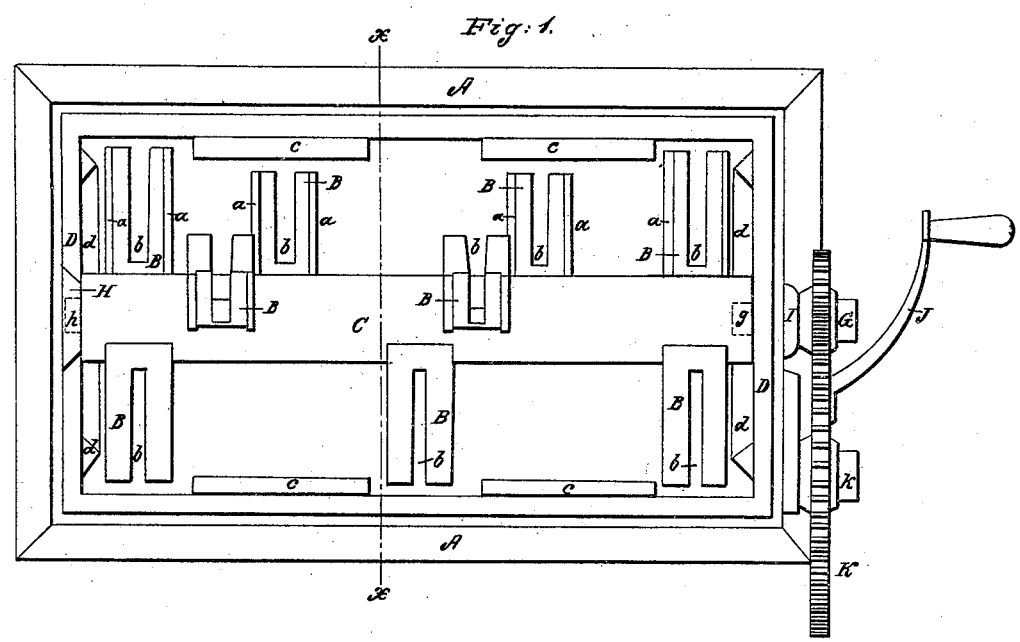
Figure 2:
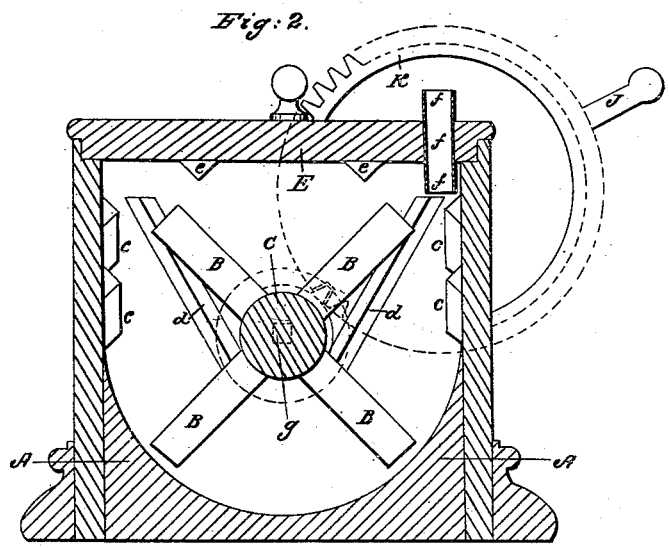

Figure 1 represents a plan or top view of the churn and butter-worker with the cover removed. Fig. 2 shows an end-view section through the same with the position of the working apparatus.

The object of my invention is to make an efficient churn and butter-worker combined, or, in other words, a good churn and a good and efficient apparatus for working over the butter and separating the buttermilk, both in one machine, without altering or changing any of the parts.

My invention consists in the form and arrangement of double beaters or floats with ribs or raised beads on both edges; also, in placing angular breakers on the sides and ends of the box, which serve to arrest the currents of cream moving against them, forcing it through the open spaces in and between the floats, directing the contents of the churn toward the center, so that it is thoroughly agitated by the beaters or floats on the revolving shaft while the cream is in a fluid state, and when it coagulates the beaters gather the particles and roll them into a mass, compressing it against the breakers, thus separating the buttermilk from the butter.

To enable others skilled in the art to make and use my improved churn and butter-worker, I will describe it more in detail, referring to the drawings and to the letters marked thereon.

I make the box A A or receptacle for the cream in form similar to many churns in use, the bottom being semicircular to conform with the radius of the floats or beaters B B B B, which are framed into the shaft C at irregular intervals to revolve with it. The beaters B B are constructed of hard white-wood, their whole width being about twice the thickness. In the center of each, from the outer end, is cut an opening, *b b b*, with beveled sides, extending to near the shaft C, there being also ribs or beads *a a* on the outer edges of the beaters, which gather the cream when the open floats or beaters are in motion, the angles being such that the cream is forced through in rapid currents, which cross each other, and are broken into thin jets, thus chafing and breaking the globules in which the small particles of butter are held, greatly facilitating the separation. The portion of cream not driven through the open spaces *b b* in the beaters B B is carried forward against the angular breaks *c c c c* on both sides and the straight breaks *e e* on the lid or cover E, and is there broken into jets, thus producing counter-currents. There are also brakes *d d* on the ends D D of the churn, so that no portion of the cream is at rest. By these arrangements of the breaks on all of the flat surfaces of the inside of the box there are currents and counter-currents produced in every direction, which greatly facilitates the separation and produces butter in a short time.

Through the lid or cover E, I place a series of small tubes, *f f f*, for the purpose of admitting the air from the outside to mix with the cream as it is being agitated, but prevents the cream from flying out and bespattering the outside of the churn.

For working the butter and separating the buttermilk it is only necessary to work the beaters slowly and pour or draw off the buttermilk, and by reversing the motion the butter will form in handsome rolls between the beaters.

For the purpose of removing the contents and washing out and drying the working apparatus, I have the shaft C made with a socket, *g*, in one end, to fit onto a square hub on the inner end of the pinion-shaft G. The arbor *h* on the other end of the shaft C is held in its bearing by a slide, H, fitted into the end of the box D above it, so that while the shaft and beaters are free to take out and replace, there is no leakage at the journals, the pinion-shaft G working in a stuffing-box, I, in the end of the box D.

The butter churn and worker is operated by a crank, J, attached to a driving cog-wheel, K, secured to a hub, *k*, on the end of the churn or box D, as seen in Fig. 1.

I am aware that there are very many churns with rotating beaters, and that they have been made of almost every conceivable form and operated by cog-gear and belts for increasing motion or gaining power, and I do not claim anything as my invention in the general features of rotating-beater churns; but

Having thus described my invention or improvements in making a good churn and butter-worker, what I claim as new, and desire to secure by Letters Patent, is—

1. The double or forked beaters, they having ribs or raised beads on both edges, as herein described, the same being so constructed as to operate in combination with reverse angular breaks on both sides and ends of the receptacle for containing the cream, so as to produce currents and counter-currents toward the center of the revolving shaft, for the purposes herein set forth.

2. The construction and arrangement of the beaters B B, with their bevel side openings, $b\ b$, and ribbed edges $a\ a$, the breaks $c\ c$, end breaks $d\ d$, top breaks $e\ e$, for the purpose of churning and working butter, substantially as and for the purposes herein specified.

Subscribed to on this 22d day of May, 1866.

G. N. BRIGHAM.

Witnesses:
  ORAMEL H. SMITH,
  JULIA BRIGHAM.